(12) United States Patent
Pierce et al.

(10) Patent No.: US 9,809,085 B1
(45) Date of Patent: Nov. 7, 2017

(54) CLIMATE CONTROL, SAFETY, AND COMMUNICATIONS SYSTEM

(71) Applicant: Black Box Enterprises, LLC, Mayflower, AR (US)

(72) Inventors: Darrell Pierce, Mayflower, AR (US); John Francis Orsi, III, Little Rock, AR (US)

(73) Assignee: Black Box Enterprises, LLC, Mayflower, AR (US)

( * ) Notice: Subject to any disclaimer, the term of this patent is extended or adjusted under 35 U.S.C. 154(b) by 0 days.

(21) Appl. No.: 15/281,035

(22) Filed: Sep. 29, 2016

(51) Int. Cl.
    *B60H 1/00* (2006.01)
(52) U.S. Cl.
    CPC ..... *B60H 1/00742* (2013.01); *B60H 1/00778* (2013.01); *B60H 1/00878* (2013.01); *B60H 1/00892* (2013.01); *B60H 1/00971* (2013.01); *B60H 1/00985* (2013.01); *B60H 1/00642* (2013.01); *B60H 1/00735* (2013.01); *B60H 1/00792* (2013.01)
(58) Field of Classification Search
    CPC ............ B60H 1/00735; B60H 1/00792; B60H 1/00742; B60H 1/00807; B60H 1/00814; B60H 1/00878; B60H 1/00885; B60H 1/00892; B60H 1/00899; B60H 1/00942; B60H 1/00642; B60H 1/00971; B60H 1/00985; B60R 21/015; B60R 21/01512; B60R 21/0153; B60R 21/01534; B60L 1/02

See application file for complete search history.

(56) References Cited

U.S. PATENT DOCUMENTS

| | | | | |
|---|---|---|---|---|
| 4,237,967 A | * | 12/1980 | Harding | B60H 1/00828 165/137 |
| 4,658,597 A | | 4/1987 | Shum | |
| 5,222,661 A | * | 6/1993 | Wenhart | B60H 1/00735 236/49.3 |
| 5,966,070 A | * | 10/1999 | Thornton | G08B 21/22 340/425.5 |
| 6,104,293 A | * | 8/2000 | Rossi | B60N 2/002 340/425.5 |
| 6,626,003 B1 | | 9/2003 | Kortum et al. | |
| 6,662,572 B1 | | 12/2003 | Howard | |

(Continued)

*Primary Examiner* — Thomas G Black
*Assistant Examiner* — Sara Lewandroski
(74) *Attorney, Agent, or Firm* — Rashauna Norment

(57) ABSTRACT

An improved climate control, safety, and communications system and method for a vehicle having a detecting means for detecting and transmitting the climate conditions inside a vehicle's passenger cabin as temperature data, and for detecting and transmitting the presence of an occupant inside the vehicle as occupancy data; a data collecting means for monitoring and evaluating the temperature data against a temperature threshold and the occupancy data against an occupant threshold, for notifying an operator of the temperature data and the occupancy data, and for sending a command to a controlling means to adjust the climate conditions, a controlling means for selectively activating a cooling mechanism or a heating mechanism to adjust the temperature inside the vehicle; and a charging means for charging the system when the vehicle engine is running and for powering the system when the engine is off. The system further includes a means for warming the undercarriage of the vehicle.

26 Claims, 10 Drawing Sheets

(56) References Cited

U.S. PATENT DOCUMENTS

| | | | |
|---|---|---|---|
| 6,922,622 B2 | 7/2005 | Dulin et al. | |
| 6,946,621 B1 * | 9/2005 | Roseman | B60B 39/025 |
| | | | 219/202 |
| 7,472,554 B2 | 1/2009 | Vosburgh | |
| 7,710,277 B2 * | 5/2010 | Wilson | B60N 2/002 |
| | | | 340/457 |
| 8,232,874 B1 * | 7/2012 | Aneiros | B60H 1/00657 |
| | | | 340/438 |
| 9,227,484 B1 * | 1/2016 | Justice | B60N 2/002 |
| 9,375,737 B1 * | 6/2016 | Zucker | B05B 7/1666 |
| 9,378,641 B2 * | 6/2016 | Beumler | B60N 2/28 |
| 2002/0066281 A1 * | 6/2002 | Gunasekera | B60H 1/00778 |
| | | | 62/186 |
| 2002/0161501 A1 * | 10/2002 | Dulin | B06B 1/0215 |
| | | | 701/45 |
| 2004/0110459 A1 * | 6/2004 | Snow | B60H 1/00428 |
| | | | 454/137 |
| 2007/0015451 A1 * | 1/2007 | McGrath | B60H 1/00742 |
| | | | 454/75 |
| 2008/0125941 A1 | 5/2008 | Mitteer | |
| 2009/0204297 A1 * | 8/2009 | Friedman | B60H 1/00742 |
| | | | 701/46 |
| 2012/0089299 A1 * | 4/2012 | Breed | B60C 11/24 |
| | | | 701/36 |
| 2013/0144470 A1 * | 6/2013 | Ricci | G06F 9/54 |
| | | | 701/2 |
| 2015/0273975 A1 * | 10/2015 | Kim | B60H 1/248 |
| | | | 454/139 |
| 2015/0286882 A1 * | 10/2015 | Nicol | G06K 9/00838 |
| | | | 348/148 |
| 2015/0306940 A1 * | 10/2015 | Salter | B60J 7/0573 |
| | | | 701/49 |
| 2016/0042624 A1 * | 2/2016 | Quave | B60N 2/002 |
| | | | 340/457 |
| 2016/0082923 A1 * | 3/2016 | Gavriel | B60R 22/48 |
| | | | 340/438 |
| 2016/0167479 A1 * | 6/2016 | Morin | B60Q 1/50 |
| | | | 701/48 |
| 2016/0272112 A1 * | 9/2016 | DeGrazia | B60Q 9/00 |
| 2016/0318368 A1 * | 11/2016 | Alger | B60H 1/00771 |

* cited by examiner

CLIMATE CONTROL, SAFETY, AND COMMUNICATIONS SYSTEM

CROSS-REFERENCE TO RELATED APPLICATION

Not applicable.

FEDERALLY SPONSORED RESEARCH AND DEVELOPMENT

Not applicable.

BACKGROUND OF THE INVENTION

1. Field of the Invention

The present invention relates to a climate control, safety, and communications system and method for selectively adjusting the climate conditions inside a vehicle after the engine is turned off, wherein an occupant is detected inside the vehicle and the temperature inside the vehicle cabin exceeds a predetermined temperature threshold.

2. Description of Arguably Related Art Including Information Disclosed for 37 CFR 1.97 and 1.98

The passenger compartment or interior cabin of a vehicle can be subjected to extreme high or low temperatures whenever the vehicle's engine is not running and if the air within the interior cabin is not adequately heated, cooled, or otherwise adequately ventilated. The vehicle can become very hot during warm weather or very cold during cold weather because the interior cabin air temperature of a vehicle is not adjusted or circulated. For example, when outside temperatures range from 80-90° Fahrenheit, the interior cabin air temperature can quickly exceed 150° Fahrenheit. These extreme high and low temperatures are seriously problematic if a living being is inadvertently or mistakenly left, or is otherwise left unattended, inside the vehicle, with the air conditioning or heating system turned off. Children and animals have suffered from serious injuries and have even died from such exposure. A suitable cooling and heating system that is operable without initiating the vehicle's engine is a crucial safety and comfort precaution. Other systems have attempted to solve or mitigate the harsh consequences of leaving a living being unattended in a vehicle subject to extreme temperatures.

U.S. Pat. No. 6,626,003 issued to Kortum et al. discloses a process for auxiliary air conditioning of a motor vehicle using solar power and a battery to operate a ventilation system when the vehicle is unoccupied and which can be activated prior to entry. The system includes a solar module, a power distribution circuit, the vehicle's battery, a thermostatic switch, the vehicle's ventilation system, and an auxiliary air conditioning system. The solar module is integrated into the roof of a motor vehicle, and connects to a power distribution circuit and to the motor vehicle's battery. The solar module and the battery provide power to the cooling system. The main priority of the power distribution means is to make sure that the battery is charged by the solar module. A secondary priority for the power distribution means is to direct power to the auxiliary ventilation system. The thermostatic switch disconnects the ventilation system and the auxiliary air conditioning system below a fixed temperature of the passenger compartment of the vehicle from the battery and the power distribution means. The air conditioning system can be activated by either a timer or by a remote control means.

U.S. Pat. No. 6,662,572 issued to Howard discloses an automobile interior climate control system that has a solar panel, a cooling and heating unit, a thermostatic switch, fans, and thermoelectric coolers. The solar panel can serve as the sole source of electricity for the system. The cooling and heating unit has separate passages for air from the interior and exterior of the vehicle to pass through to selectively heat or cool the interior air passing through the unit.

U.S. Patent Application Publication No. 2007/0015451 filed by McGrath, Jr. discloses an automatic temperature control system for an unattended motor vehicle. The system includes a solar panel, a battery, a vehicle motor, a sensing apparatus, and a motion sensor. The solar panel energizes an auxiliary battery for a motor. The sensing apparatus is coupled with the battery and the motor to actuate the motor once a temperature threshold is reached after command from a motion detector or a motion sensor that detects an occupant inside the vehicle. Therefore, the air conditioning system is automatically activated when an occupant is detected inside the vehicle and a temperature threshold has been exceeded.

U.S. Pat. No. 7,472,554 issued to Vosburgh discloses a system having a carbon dioxide sensor, a temperature sensor, and a controller for detecting the presence of a person or animal left inside a vehicle experiencing extreme temperatures. A motion sensor, weight sensor, or sound sensor can be used with the system to detect a living being. The system may also use a cellular communication system to transmit statistical information such as temperature, carbon dioxide level, and the amount of time the car has been closed.

The references do not disclose, teach, or suggest an improved climate control, safety, and communications system for selectively adjusting the climate conditions inside a vehicle when an occupant is inside the cabin after the engine is off, wherein the system comprises (includes or has) (a) a monitoring mode for detecting and monitoring the climate conditions and at least one occupant inside the vehicle and for notifying an operator of the status, wherein the monitoring mode includes (1) a detecting means for detecting at least the interior cabin air temperature inside the vehicle as temperature data and for detecting at least one occupant inside the vehicle while the engine is turned off as occupancy data, and (2) a data collecting means for collecting, monitoring, and evaluating the temperature data and the occupancy data wherein the data collecting means has a CPU, at least one data storage means, a control connector, a display, and a fingerprint scanner; (b) a controlling mode for selectively adjusting the climate conditions inside the vehicle by activating a cooling mechanism or a heating mechanism with a controlling means, wherein the controlling means includes a plurality of relays, the cooling mechanism, and the heating mechanism; and (c) a charging mode for charging a power source for the system while the engine is running, wherein the power source is a plurality of batteries that power the system when the engine is off.

A need exists for an improved climate control, safety, and communications system for a vehicle that detects the temperature inside the vehicle beyond a predetermined threshold and the presence of an occupant over a predetermined time period, that notifies an operator of the status, and that independently and selectively adjusts the heating or cooling mechanisms inside the vehicle.

A need exists for an improved climate, safety, and communications control system for a vehicle that utilizes a plurality of sensors to obtain temperature readings and the presence of at least one occupant remaining inside an unattended vehicle, with a CPU to evaluate the temperature data and occupancy data, to notify the operator of the status, and to independently send a signal to actuate a controlling means to adjust the climate inside the vehicle.

A need exists for an improved climate control, safety, and communications system for a vehicle that provides one or more fail safes for controlling the climate inside the vehicle.

A need exists for an improved climate control, safety, and communications system for a vehicle that utilizes its own power source and is operable without needing the vehicle's engine.

A need exists for an improved climate control, safety, and communications system for a vehicle that provides a safety precaution against an occupant being inadvertently or accidentally left inside the vehicle over a prolonged period of time wherein the occupant is being exposed to extremely high or low temperatures.

SUMMARY OF THE INVENTION

In general, the invention provides an improved climate control, safety, and communications system and method for selectively controlling and adjusting the climate conditions inside the passenger compartment, interior cabin or cab of a vehicle, particularly after the vehicle's engine is shut off, if a low or high interior cabin air temperature exceeds a predetermined temperature threshold and if an occupant is detected inside the vehicle. The invention also provides an operator with additional security against unauthorized operation of the vehicle by allowing the operator to remotely or wirelessly prevent or stop someone else from starting the vehicle or from continuing to operate the vehicle.

The system has a charging mode, a monitoring mode, a controlling mode, a detecting means, a data collecting means, a controlling means, and a charging means. The system converts to charging mode when the vehicle engine is running. Here, the charging means charges the system to provide power to the system when later in monitoring mode and controlling mode. The system converts to monitoring mode, then to controlling mode, particularly after the vehicle engine is turned off. While in monitoring mode, the detecting means continuously detects the ambient air temperature outside the vehicle and the interior cabin air temperature, transmitting the readings for each as temperature data to a data collecting means. The detecting means also detects the presence of at least one occupant remaining inside or entering into the vehicle, transmitting the information as occupancy data to the data collecting means. Also while in monitoring mode, the data collecting means collects, monitors, and evaluates the received temperature data and occupancy data to determine whether the interior cabin air temperature has exceeded a predetermined temperature threshold and whether an occupant is inside the vehicle, then notifies the operator of the status and sends a command to the controlling means. The system converts to controlling mode when the controlling means selectively adjusts the climate conditions inside the vehicle by raising or lowering the interior cabin air temperature with a cooling mechanism or a heating mechanism.

In one embodiment, the invention provides an improved climate control, safety, and communications system for a vehicle having an interior passenger cabin, said system comprising (including or having): (1) a detecting means for detecting the climate conditions for a vehicle as temperature data and the presence of at least one occupant inside the vehicle cabin as occupancy data, and for continuously transmitting the temperature data and the occupancy data to a data collecting means; (2) the data collecting means for monitoring and evaluating the temperature data for exceeding a temperature threshold and the occupancy data for exceeding an occupant threshold, for communicating the status of the temperature data and the occupancy data as a notification to an operator, and for sending a command to a controlling means; (3) the controlling means for selectively controlling and adjusting the climate conditions inside the vehicle cabin, the controlling means having a plurality of relays, a cooling mechanism, and a heating mechanism; and (4) a charging means comprising at least two power sources for charging the system and for powering the system when the vehicle engine is turned off.

In another embodiment, the invention provides an improved climate control, safety, and communications system for a vehicle having an interior passenger cabin, the system comprising: (1) a detecting means comprising at least one temperature sensing mechanism for detecting at least the air temperature inside the vehicle cabin as temperature data, and at least one occupant sensing mechanism for detecting the presence of at least one occupant inside the vehicle cabin as occupancy data, with the detecting means continuously transmitting the temperature data and the occupancy data to a data collecting means; (2) the data collecting means for monitoring and evaluating the temperature data for exceeding a temperature threshold and the occupancy data for the presence of at least one occupant, for communicating the status of the temperature data and the occupancy data as a notification to an operator, and for sending a command to a controlling means, wherein the data collecting means comprises a central processing unit ("CPU"), at least one data storage means, a control connector, and a communication means for notifying an operator of the status of the temperature data and occupancy data; (3) the controlling means for selectively controlling and adjusting the climate conditions inside the vehicle cabin upon command from the data collecting means, wherein the controlling means comprises a plurality of relays, a cooling mechanism, and a heating mechanism; and (4) a charging means comprising at least two power sources for charging the system and for powering the system when the vehicle engine is turned off.

In yet another embodiment, the invention provides an improved climate control, safety, and communications system for a vehicle having at least an undercarriage, one or more wheels, and a wheelbase, the system comprising: (1) a detecting means comprising at least one undercarriage temperature sensing mechanism for detecting the climate conditions of the undercarriage as undercarriage temperature data, and a means for continuously transmitting the undercarriage temperature data to a data collecting means; (2) the data collecting means comprising a CPU, at least one data storage means, a control connector having a harness coupling the CPU to the undercarriage temperature sensing mechanism, and a communication means, wherein the CPU monitors and evaluates the undercarriage temperature data for exceeding an undercarriage temperature threshold, for directing the communication means to notify an occupant of the status of the undercarriage temperature data, and for sending a command to a controlling means to alter the climate conditions around the undercarriage or, if the climate adjustment has already been made, to cease the adjustment; (3) and the controlling means comprising a plurality of relays, a heating element, and at least one heat transfer member for transferring heat from the heating element to the undercarriage, with the controlling means initiating the heating element to warm, thaw, or de-ice the undercarriage.

It is an object of the invention to provide an improved climate control, safety, and communications system for a vehicle that utilizes a plurality of sensors to detect the temperature inside the vehicle cabin and to detect the presence of an occupant inside the vehicle whose engine is shut off; that has a data collecting means to monitor and evaluate whether the temperature data exceeds a temperature threshold and the occupancy data exceeds an occupancy threshold, to notify an operator of the status of the temperature data and occupancy data via a communication means, to independently cooperate with a controlling means to adjust the climate inside the vehicle to within a temperature threshold; and that has a charging means for charging and later powering the system with one or more power sources.

It is yet another object of the invention to provide an improved climate control, safety, and communications system for a vehicle that provides one or more fail safes and safety features for detecting, monitoring, evaluating, and controlling the climate conditions inside the vehicle.

It is another object of the invention to provide an improved climate control, safety, and communications system for a vehicle that allows an operator to exert offsite control to adjust climate comfort settings before a temperature threshold is exceeded.

It is another object of the invention to provide an improved climate control, safety, and communications system for a vehicle to selectively heat or cool the interior cabin of the vehicle while using an alternative source of power for the system without using the vehicle's engine as the primary power source.

It is another object of the invention to provide an improved climate control, safety, and communications system for a vehicle that can detect and alert an operator to the presence of an occupant remaining inside a parked vehicle that is subject to extreme temperatures.

It is another object of the invention to provide an improved climate control, safety, and communications system for a vehicle that is used as a preventive measure to theft or unauthorized access or operation of the vehicle.

It is yet another object of the invention to provide an improved climate control, safety, and communications system for a vehicle that has a data storage means to store temperature data, occupancy data, external data, and information about the vehicle for later access, particularly in obtaining information about the vehicle's condition and operation before and during a vehicular accident.

These and other aspects, features, objects, embodiments, and advantages of the present invention will become apparent from the accompanying drawing and the following detailed description of the invention.

BRIEF DESCRIPTION OF THE SEVERAL VIEWS OF THE DRAWING

The invention may be more readily described by reference to the accompanying drawing figures and the following description of the drawing figures. The reference numbers shown in the drawing apply to each embodiment of the invention. In the drawing.

DETAILED DESCRIPTION OF THE INVENTION

Figure 1:
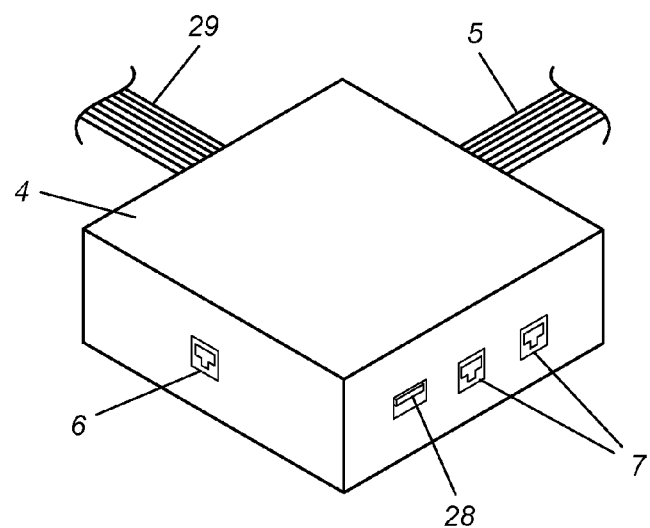
FIG. 1 is a perspective view of a portion of a preferred embodiment of a climate control, safety, and communications system for a vehicle, showing a CPU having multiple connection ports and two wired harnesses.

The present invention, preferred embodiments of the invention, and the accompanying drawing figures as described herein should not be construed as limited to the illustrated drawing. Rather the illustrated embodiment(s) are detailed to provide a thorough disclosure suitable to convey the scope of the invention to those skilled in the art. For the sake of simplicity, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

A "vehicle" refers to any vehicle, automobile, or motorized transport having a passenger cab, cabin, or compartment, and in another embodiment, the vehicle further includes an undercarriage, at least one wheel, and a wheelbase.

An "operator" refers to a person or entity who typically operates or controls the vehicle. The operator is also the one who receives the notification alerts from the system so additional action can be taken, including, but not limited to, removing the occupant from exposure to exceeded temperatures or sending a response signal to the data collecting means, which can direct the controlling means to make further adjustments to the climate inside the vehicle.

An "occupant" refers to any person or animal remaining inside or entering into the vehicle after the engine is turned off. In many instances, the occupant is one who is incapacitated, incapable, or otherwise unable to exit the vehicle to avoid exposure to extremely high or low temperatures inside the vehicle. In some instances, the occupant may also include the operator. The type of occupant includes, but is not limited to, an infant, a child, an elderly individual, an individual in need of assistance, or an animal.

Referring more particularly to the drawing figures and by the reference numbers, FIGS. 1-9 illustrate an embodiment of an improved climate control, safety, and communications system and method for a vehicle that aids an operator in maintaining the climate conditions and in detecting at least one occupant inside the passenger compartment, interior cabin or cab (collectively, the "cabin") of the vehicle, in increasing the security of the vehicle against theft or unauthorized access or operation, and in communicating to the operator the status of the temperature data and occupancy data. The system has multiple fail safes in the form of a plurality of relays and backup power to facilitate running the system for extended time periods when the engine is off. The system further allows an operator to customize some of the settings for comfort cooling conditions for the cabin, including, but not limited to, the range of the temperature threshold, the type of occupant remaining in the vehicle for detecting and monitoring, and the amount and type of notifications transmitted to the operator.

In a preferred embodiment the system has a charging mode for charging the electronic components of the system and for updating a data collecting means with external data; a monitoring mode for detecting, monitoring, and evaluating the climate conditions as temperature data and the status of at least one occupant inside the vehicle as occupancy data, and for notifying the operator of the temperature data and occupancy data; and a controlling mode for selectively activating a cooling mechanism or a heating mechanism to alter the climate inside the vehicle. The system further has a detecting means for detecting the temperature inside and outside the vehicle as temperature data, for detecting the presence of an occupant inside the vehicle after the engine is turned off as occupancy data, and for transmitting the temperature data and the occupancy data to a data collecting means; the data collecting means for monitoring and evaluating the temperature data and the occupancy data, for communicating the status of the vehicle to the operator, and for sending a command to alter the cabin climate to a controlling means; a controlling means for selectively adjusting the climate inside the vehicle cabin with a cooling mechanism or a heating mechanism; and a charging means for powering and for charging the system.

The charging mode charges the system with a charging means while the vehicle engine is running. It also utilizes the data collecting means to gather data from other outside factors as external data, and evaluates the information obtained so that the data collecting means can adjust its settings for implementation after the vehicle engine is turned off. The system has a detecting means and a controlling means, each of which is in electrical connectivity with a data collecting means and is wired into the vehicle. With the engine off, the system converts from charging mode to monitoring mode and activates the detecting means to continuously detect and transmit temperature data and occupancy data to the data collecting means, namely, a CPU, so that the CPU can evaluate whether a predetermined temperature threshold has been exceeded and whether one or more occupants is detected inside the vehicle. Whenever the temperature and/or occupancy parameters are met, the CPU cooperates with a communication means to transmit a notification alert to the occupant. The CPU also sends a signal to a controlling means to selectively activate a cooling mechanism or a heating mechanism. The CPU further determines when the cabin climate has been sufficiently adjusted, then sends another signal to the controlling means to disengage the cooling mechanism or the heating mechanism. The CPU also sends another notification alert to the operator that the climate has successfully adjusted.

In another embodiment, the detecting means further includes an undercarriage temperature mechanism for detecting the condition of the vehicle's undercarriage, one or more wheels, and wheelbase, and for continuously transmitting the signal to the data collecting means for evaluation. The data collecting means monitors and evaluates the undercarriage temperature sensing mechanism to determine if it exceeds an undercarriage temperature threshold. In addition to notifying the operator of the undercarriage data, the data collecting means sends a signal to the controlling means to activate a heating element to warm the undercarriage. Once the condition of the undercarriage has been adjusted and has been detected by the detecting means, the data collecting means sends another signal to the controlling means to disengage the heating element from imparting heat toward the undercarriage.

The detecting means essentially comprises a temperature sensing mechanism for detecting or sensing temperature readings as temperature data, and an occupant sensing mechanism for detecting or sensing at least one occupant inside the vehicle after the engine is off as occupancy data. The detecting means continuously transmits the temperature data and the occupancy data to a data collecting means.

The temperature sensing mechanism has at least one sensor or detector (collectively, "temperature sensor") for detecting temperature and for sending the obtained data to the data collecting means. In a preferred embodiment, the temperature sensing mechanism comprises a first temperature sensor, namely, an interior cabin air temperature sensor 1, and a second temperature sensor, namely, an ambient air temperature sensor 2. Each of the temperature sensors 1, 2 continuously transmits temperature data to the data collecting means when the system is in monitoring mode. Each of the temperature sensors 1, 2 is wired to and is in electrical connectivity with a control connector 5. Any type sensor capable of measuring temperature or environmental readings and transmitting that data to the data collecting means should be suitable for this purpose and function. In another embodiment, only one temperature sensor is used. In this instance, this single temperature sensor should be sensitive enough to detect not only the interior cabin air temperature, but also the ambient air temperature outside the vehicle. The location of each temperature sensor is semi-permanently mounted to the vehicle to allow access, maintenance, and replacement of the sensor.

The system provides a default predetermined high and low temperature threshold for low and high temperature ranges inside the vehicle (collectively, "temperature threshold"). The temperature threshold may also be adjusted to accommodate anticipated weather conditions for the season or the geographic location of the vehicle based on external information obtained by the data collecting means. The temperature threshold may also be selectively adjusted by the operator by inputting the alternative temperature threshold into the CPU via the graphic user interface or another external device. A low temperature threshold of at least 60° Fahrenheit is preferred. A high temperature threshold of at least 85° Fahrenheit is preferred. For comfort cooling, a current industry standard for the temperature threshold is 68-75° Fahrenheit.

The cabin air temperature sensor 1 is activated when the system converts from charging mode to monitoring mode after the vehicle engine is shut off. The cabin air temperature sensor 1 continuously detects the climate conditions, namely air temperature, inside the vehicle and transmits the reading to the CPU 4 as temperature data. In a preferred embodiment shown in FIGS. 3 and 4, the cabin air temperature sensor 1 is positioned or disposed on or inside the ceiling in the cabin of the vehicle. Alternatively, the cabin air temperature sensor 1 may be located at any suitable location inside the cabin. The cabin air temperature sensor 1 should be durable to withstand and to measure extreme high and low temperatures that can be reached inside the vehicle when the engine is shut off.

The ambient air temperature sensor 2 is activated when the system converts from charging mode to monitoring mode after the vehicle engine is shut off. The ambient air temperature sensor 2 continuously detects the climate conditions outside the vehicle and transmits the reading to the CPU 4 as part of the temperature data. In a preferred embodiment shown in FIGS. 3 and 4, the ambient air temperature sensor 2 is positioned or disposed on the exterior of the vehicle. The ambient air temperature sensor 2 should be sturdy and durable to withstand extreme cold or hot weather conditions, other elements of rain, sleet, freezing rain, snow, as well as environmental and wear conditions, including debris, cleaning and maintenance of the vehicle.

The occupant sensing mechanism is activated when the system converts from charging mode to monitoring mode after the engine is turned off. The occupant sensing mechanism has at least one sensor 3 or detector (collectively, "occupant sensor") which continuously detects the presence of at least one occupant as occupancy data, with the occupant sensor 3 transmitting that occupancy data to the data collecting means. Each occupant sensor is positioned on, in, or under each seat inside the vehicle. Alternatively, the occupant sensor 3 may be located at any suitable location inside the vehicle passenger cabin if that sensor is capable of detecting the presence of an occupant. Each occupant sensor should be capable of being calibrated after installation. For example, if a safety seat is placed on the vehicle's seat, the occupant sensor may need to be calibrated to disregard the weight of the safety seat so that only the weight of the occupant is detected. The occupant sensor should be sensitive enough to detect the presence or the low weight of an occupant weighing only a few pounds, as low as 5 or 6 pounds. The "occupant threshold" has been met or exceeded if the occupant sensing mechanism detects at least one occupant.

The occupant sensor may be selected from the group consisting of magnetometers, infrared devices, motion sensors and detectors having a recording means, preferably one capable of obtaining visual images, body heat sensors, BTU sensors, and combinations thereof. Use of one or more magnetometers is preferred. The system may be customized to include any combination or arrangement of occupant sensors.

Figure 3:
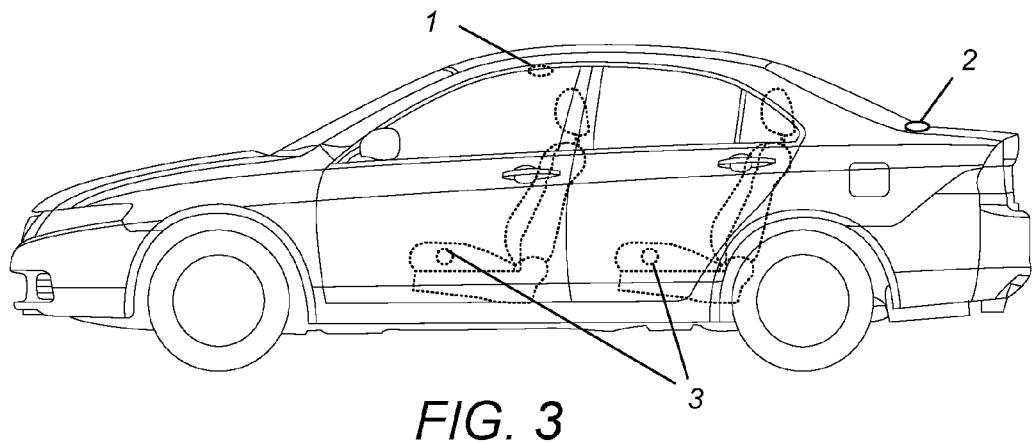
FIG. 3 is a side cutaway of the interior of vehicle for the system of FIG. 1 thereof, showing placement of an interior cabin air temperature sensor, an ambient air temperature sensor, and a plurality of occupant sensors.
Figure 4:
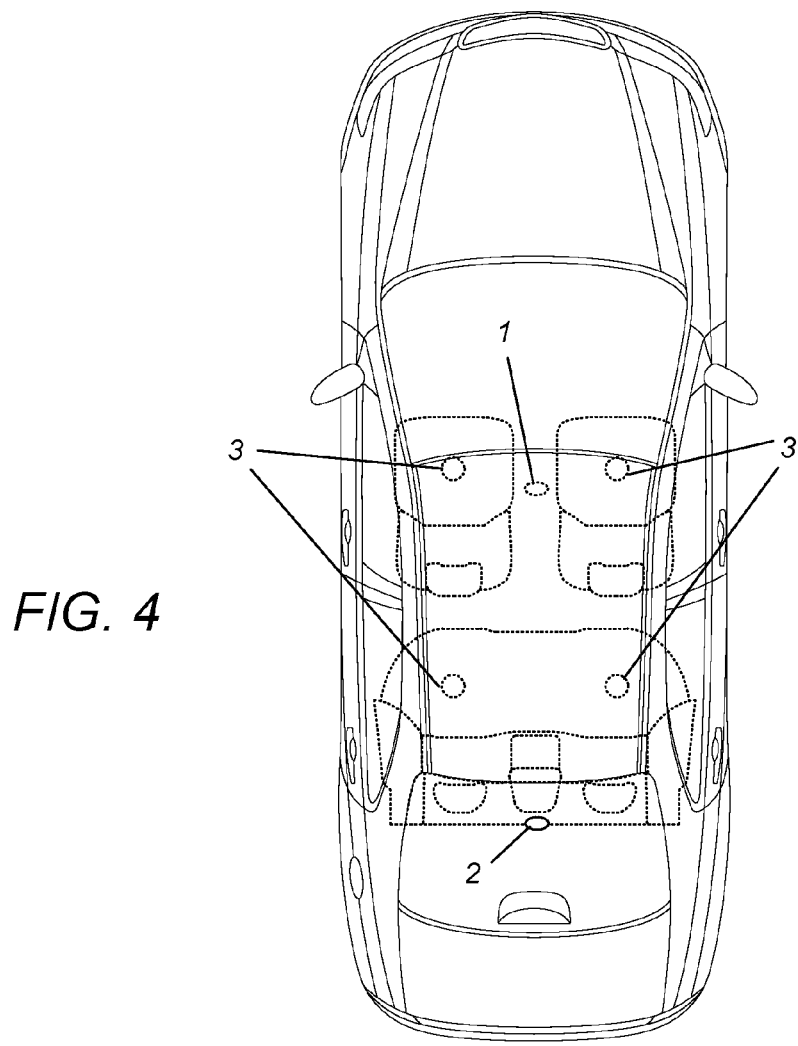
FIG. 4 is a top plan view of FIG. 3 thereof.

In an embodiment, the occupant sensing mechanism has at least one magnetometer occupant sensor 3 for detecting the displacement of weight of the driver operator and of any passenger occupants. The magnetometer occupant sensor 3 uses a magnetic field to detect the physical presence of an operator or occupant inside the cabin. More particularly, the magnetometer senses or detects the displacement of the operator or occupant on the x, y, and z axis. The magnetometers can provide more accurate data for calculation and evaluation by the CPU if the magnetometers are positioned near opposite corners of the cabin, as shown in FIGS. 3 and 4. In another embodiment, at least two magnetometers may be used with the system. In a preferred embodiment shown in FIGS. 3 and 4, the occupant sensing mechanism has four magnetometers 3, with a magnetometer positioned under or inside the driver seat, front passenger seat, and each rear side back seat. The magnetometer detects whether an occupant remains inside or enters into the vehicle after the system is converted to monitoring mode. The displacement reading is the occupancy data that is transmitted to the CPU for monitoring and evaluation. The magnetometer can be programmed to recognize the specific displacement of one or more persons or animals as a standard for later implementation and monitoring by the system. The plurality of magnetometers also acts as a failsafe and backup if one of the magnetometers fails or provides an inaccurate reading.

In another embodiment, the occupant sensor is a motion sensor that detects movement within the cabin. The motion sensor includes or otherwise cooperates with a recording means (not shown). The motion sensor should be at least partially visible and positioned inside the cabin in a suitable location to readily detect and capture the occupant. Positioning the motion sensor near the ceiling light is preferred for maximum view. The motion sensor may be installed with a removable fastening means, film, or adhesive. The motion sensor should be small enough to be inconspicuous, to not interfere with an occupant sitting in any of the seats, and to not impede the driver's view when driving. In another embodiment, the occupant sensing mechanism includes an infrared sensor (not shown). In yet another embodiment, the occupant sensing mechanism includes a motion sensor (not shown) and a body weight sensor (not shown).

In a preferred embodiment, the system's detecting means includes the cabin air temperature sensor 1, the ambient air temperature sensor 2, and a plurality of magnetometers 3. In another embodiment, the system's detecting means includes the cabin air temperature sensor 1, the ambient air temperature sensor 2, and an infrared sensor. In yet another embodiment, the system's detecting means includes the cabin air temperature sensor 1, the ambient air temperature sensor 2, the infrared sensor, and the occupancy weight sensor. In yet another embodiment, the system includes the cabin air temperature sensor 1, the ambient air temperature sensor 2 and the motion sensor.

Figure 5:
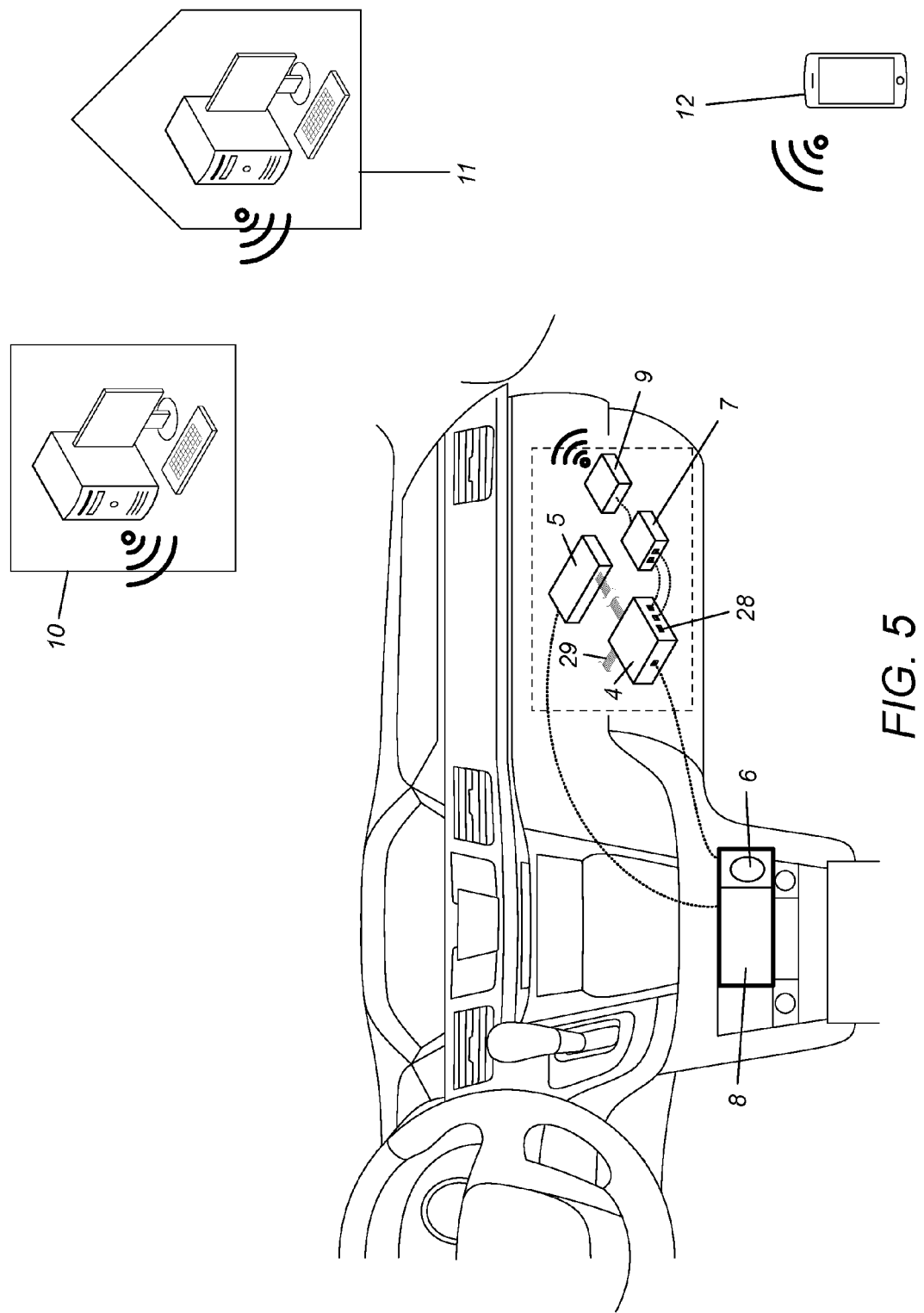
FIG. 5 is a schematic of a portion of the invention of FIG. 1, showing connection of the CPU, a hard drive, a wireless transmitter, different receiving devices, a control connector, the fingerprint scanner, and the graphic user interface display screen.
Figure 6:
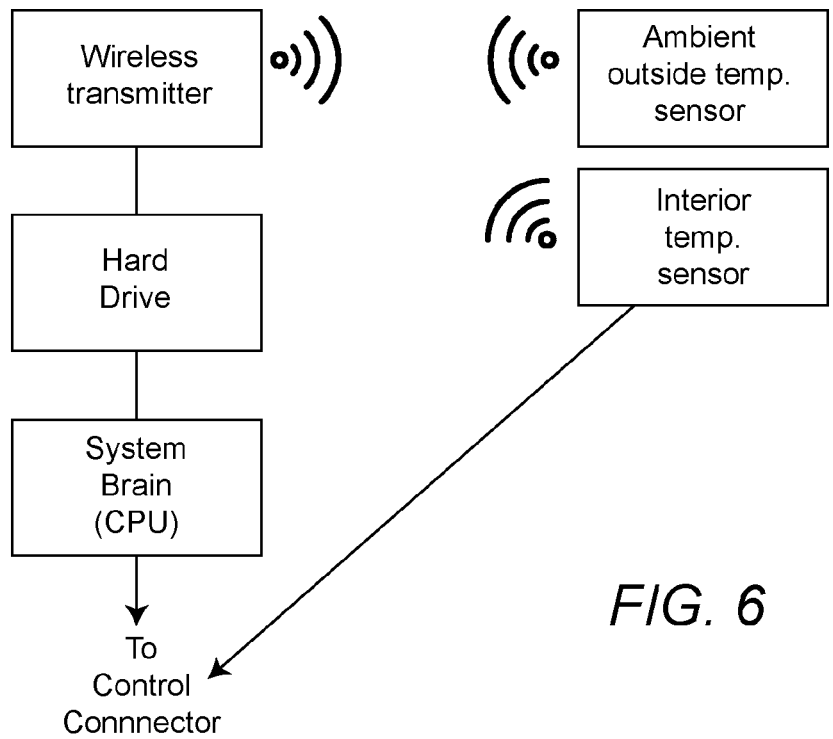
FIG. 6 is a flow chart of the interaction between the temperature sensors and the CPU of the system of FIG. 1 thereof.
Figure 7:
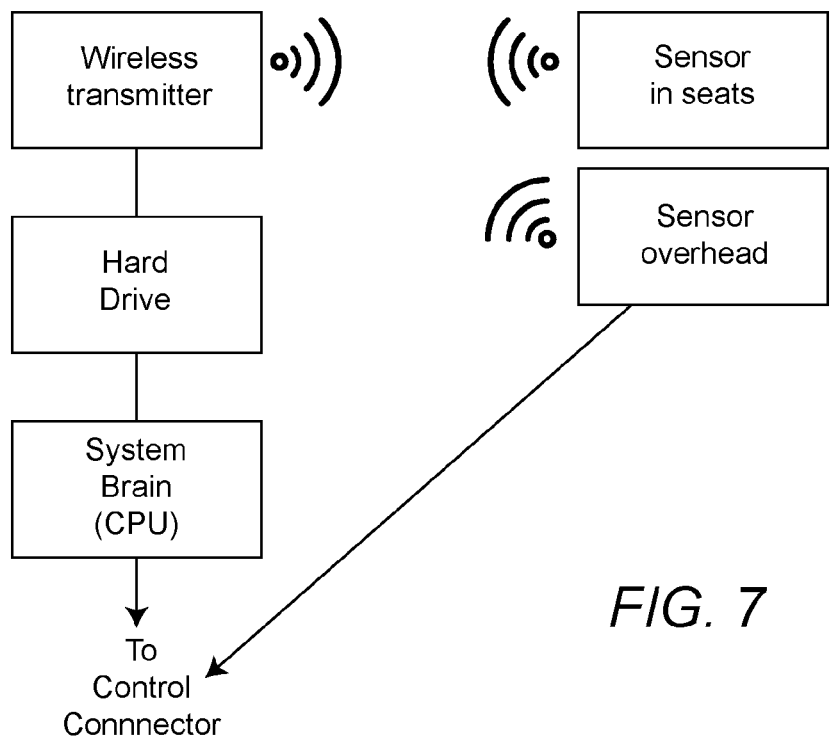
FIG. 7 is a flow chart of the interaction between the occupant sensors and the CPU of the system of FIG. 1 thereof.
Figure 8:
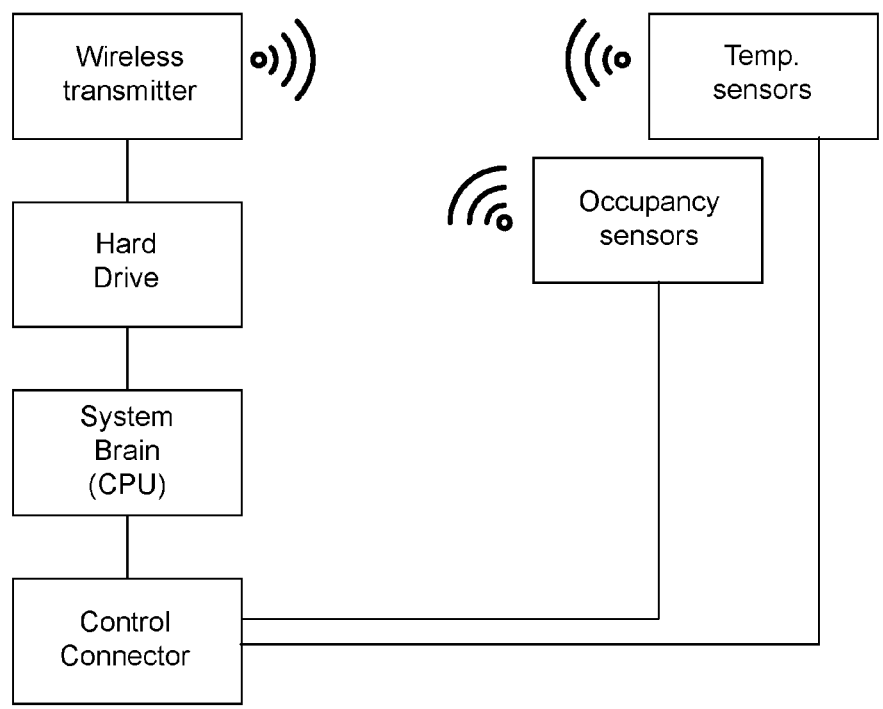
FIG. 8 is a flow chart of the interaction between the temperature sensors, the occupant sensors, and the CPU of the system of FIG. 1 thereof.

As shown in FIGS. 1 and 5, the data collecting means has a CPU, a control connector with a wired harness, at least one data storage means, a communication means, and a display with a wired harness. As the central hub of the system, the CPU has multiple functions and purposes. The CPU continuously receives temperature data, occupancy data, external data, and customized preferences from the operator, occupant, or external sources. When in monitoring mode, the CPU monitors and evaluates the different data in real time to determine whether one or more thresholds have been exceeded, and if so, to determine which of the action parameters should be implemented. If the CPU determines that the occupant threshold and the temperature threshold have both been exceeded, for example, if the temperature data has a reading of 85° F. then its action parameter is to direct a communication means to notify the operator of the status and to independently send a command to the controlling means to activate the cooling mechanism to adjust the climate conditions inside the cabin. When the temperature data reading drops near 84° F., the CPU will then direct the controlling means to turn off the cooling mechanism, and will allow an internal blower and a fan to further lower the temperature to save energy. The CPU will send an updated notification to the operator of the adjusted climate conditions.

When the system is in charging mode, the CPU remains activated and obtains updated information about pending weather conditions based on the geographic location of the vehicle from available satellite, Wi-Fi, Bluetooth, or other available wireless or remote means (collectively, "external data"). The CPU evaluates the updated information in real time and adjusts the temperature threshold and action parameters for implementation when the system converts to monitoring mode. The CPU cooperates with the vehicle's onboard GPS so that the CPU can modify the comfort cooling setting based on the environmental conditions so that the CPU remains efficient. The CPU will send the notification alert to the operator immediately upon an action parameter. At five minutes later, the CPU will send a reminder to the operator if operator has not responded, with this reminder stating that the CPU will independently activate the controlling means unless overrode. The CPU will initiate the controlling means within ten minutes of an occupant being detected inside the vehicle who is being subjected to exceeding the temperature threshold.

The CPU may be located near or with the other dashboard or electronic components inside the vehicle. As shown in FIGS. 1, 2, and 5-8, the CPU 4 has a plurality of connection ports along with the software for evaluating the different data. The CPU 4 is coupled to and is in electrical connectivity with the control connector 5 by a wired harness for receiving the temperature data and the occupancy data, to the display 8 with another wired harness 29, and to the data storage means. The CPU 4 may also include a USB port 28 for receiving a cable from the charging means (not shown) to charge the system with an external power source, and a connection port for connecting to a fingerprint scanner 6. The CPU 4 is also operatively connected to the controlling means, particularly to the 12V relay 13, to direct the controlling means to selectively activate the cooling mechanism 14 or heating mechanism 16. The CPU has its own memory battery that alternatively powers the CPU so that the CPU can continue to receive, monitor, and evaluate all the incoming data including, but not limited, temperature data, occupancy data, and external data. The CPU continues to re-evaluate and make changes to the system's responses based on the incoming data. The CPU further sends all data to the data storage means for storage and later access.

In another embodiment, the CPU can be used against authorized operation of the vehicle. If the CPU determines that only the occupant threshold has been exceeded, then its action parameter is to notify the operator of a potential unauthorized operation or access of the vehicle. The operator can return a command to the CPU via the communication means about whether the occupant driver is authorized to operate the vehicle. If so authorized, the CPU will take no further action and the system will convert to charging mode when the engine starts. If not authorized, the CPU will send a command to the controlling means which is further coupled to the vehicle's existing mechanical and electronic components to prevent the engine from starting or to turn it off. Alternatively, an occupant driver may key in a password or use the fingerprint scanner to override and prevent the notification from being sent to the operator.

The data storage means includes at least one data storage member or device 7 having a capacity to retain a large amount of information over an extended period of time, and an offsite external server 10 for long term data storage. At least one data storage member 7 is coupled to the CPU 4 at a connection port on the CPU 7. The data stored on the data storage member should be encrypted and includes, but is not limited to, the temperature data, the occupancy data, the external data, and the customized and preprogrammed settings for the system. The data storage member may be a hard drive or other storage member including, but not limited to, one or more SD cards. In a preferred embodiment, the data storage means has two data storage devices 7, preferably two hard drives, and an offsite external server 10, with the first hard drive used as the primary storage device and the second hard drive used as the backup storage device. Preferably, all hard drives used with this system run at least one to multiple encryptions. Each hard drive is backed up to the server every 2-8 hours. As shown in FIGS. 1 and 5, the hard drive 7 is dual wired to the CPU 4, and is a single wired to the wireless transmitter 9 of the communication means. The hard drive may further include a USB port outlet for plugging the hard drive into the vehicle's corresponding USB adapter. The hard drive may also include an adapter for use with the vehicle's cigarette lighter. A solid state drive (SSD) may be used rather than an HD optimal.

If an SD card is used, it is used to backup both the internal memory of the hard drive and the external hard drive. If an SD card is not used, then the data is backed up to the hard drive's internal memory or to a compressed file. The data storage member is also useful in retrieving information about the vehicle's operation when reviewing information from a vehicular accident. When the system is used this capacity, the vehicle's microphone can be triggered for up to 45 seconds in the instance of a sudden or extreme movement of the vehicle, particularly during a collision. The notification alert can also notify the operator of any damage to the system, a malfunction, and whether a climate adjustment has been made or whether there has been a displacement of an occupant. The CPU; and as a result the communication means, will use the notification alert to ask whether the system should continue adjusting the climate inside the cabin.

Figure 2:
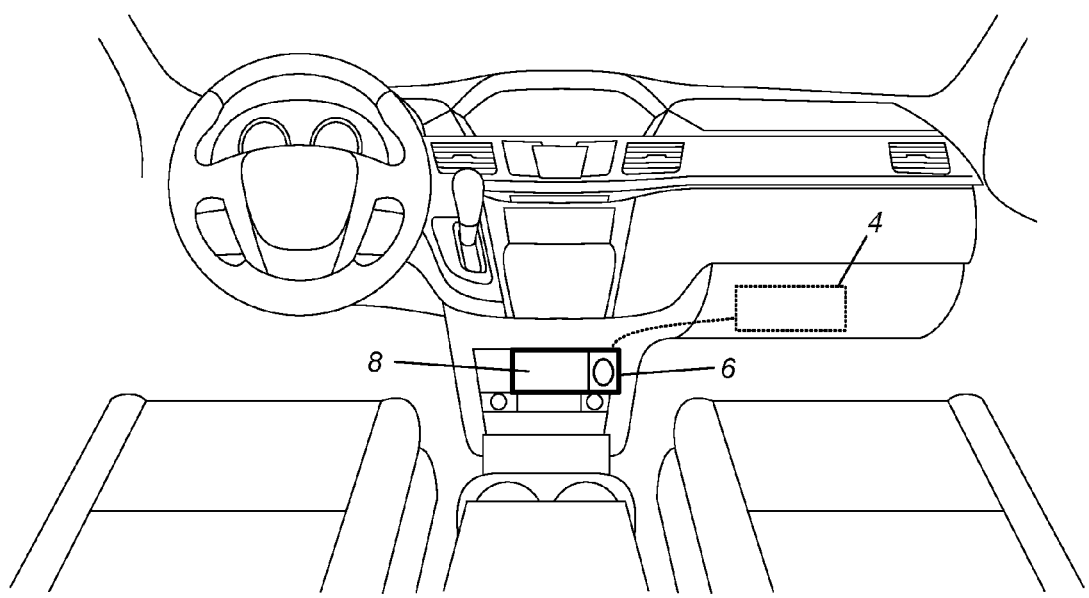
FIG. 2 is an interior perspective view of a portion of the system of FIG. 1 thereof, showing a fingerprint scanner, a graphic user interface display screen, and a location of the CPU.

In FIGS. 1 and 2, the data collecting means further includes a fingerprint scanner 6. The fingerprint scanner affords the operator and other authorized users the added security against theft of the vehicle and to minimize unauthorized changes to the system's settings. The fingerprint scanner may be used to identify the owner of the vehicle, the operator, and/or occupants. The fingerprint scanner 6 is coupled to the CPU 4 and in another embodiment, to the display 8.

The display 8 may be a graphic user interface with a display screen for viewing and accessing menu settings of the system while inside the vehicle. Here, the operator can adjust, customize, and set the temperature threshold, the occupant threshold, the notification settings, and other commands and actions of the system. FIGS. 1-2, and 5 show the display being connected to the CPU by a wired harness. The display may further include at least one speaker and an audible member (not shown), with adjustable sound settings. The sound setting and all sound data may be stored on the data storage means and further backed up to the external server. The menu settings may be further adjusted and customized while inside the vehicle, remotely or wirelessly.

The control connector 5 connects the detecting means, more particularly, each temperature sensor 1, 2 and each occupant sensor 3, to the CPU 4, and also connects the CPU 4 to the controlling means, and more particularly, to a 12V switching relay 13. As shown in FIGS. 1 and 5, the control connector connects these components to the CPU with a wired harness.

The communication means notifies the operator through a network that the temperature threshold and occupant threshold have been exceeded, or that an occupant is attempting unauthorized operation or access to the vehicle. The operator may also send a command back to the CPU, overriding the CPU's independent command to the controlling means to adjust the climate conditions to a different setting or to confirm that the system should prevent the occupant from operating the vehicle. An occupant from inside the vehicle may also independently activate the controlling means by pressing an appropriate icon or button on the display screen before the temperature threshold has been exceeded.

The communication means includes a transmitter 9, a network, and at least one external receiving member 10, 11, 12. The transmitter 9 is coupled to the hard drive 7. The receiving member may be selected from the group consisting of mobile or handheld devices, desktop computers, offsite external servers, the system's GUI display screen, and combinations thereof, each of which is capable of receiving notification alerts from the CPU and of sending a return respond command back to the CPU. The transmitter cooperates with the CPU and the hard drive to send some or all data to the external server for long term storage and access. The communication means can be adapted to send the notification alert by SMS, e-mail, photo, or any other method of communication to the receiving member. The network may be selected from the group consisting of being Bluetooth enabled, Wi-Fi compatible, satellite ready, and combinations thereof. The transmitter may send the notification alert to the display screen, and wirelessly or remotely to the operator's mobile device, computer, and external server. FIG. 5 illustrates a notification alert may be transmitted wirelessly to and from a mobile phone 12, a home or office computer 11, or an offsite or external server 10. The transmitter is further in connectivity with a controller of the controlling means to select the path to initiate either a cooling mechanism or a heating mechanism.

Figure 9:
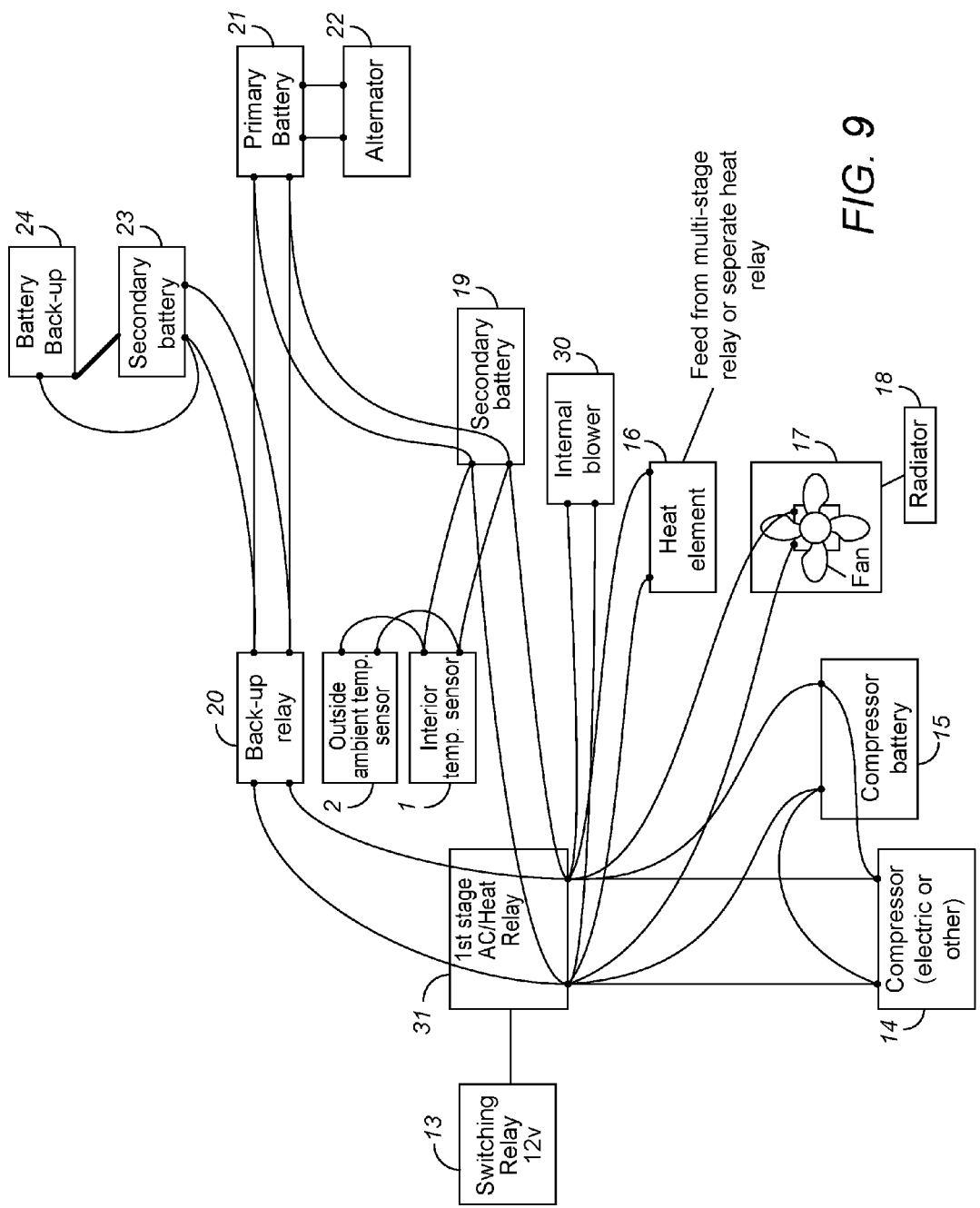
FIG. 9 is a schematic of the circuitry of the controlling means and the charging means, showing the plurality of relays, the cooling mechanism, the heating mechanism, and the power sources of the system of FIG. 1 thereof.
Figure 10:
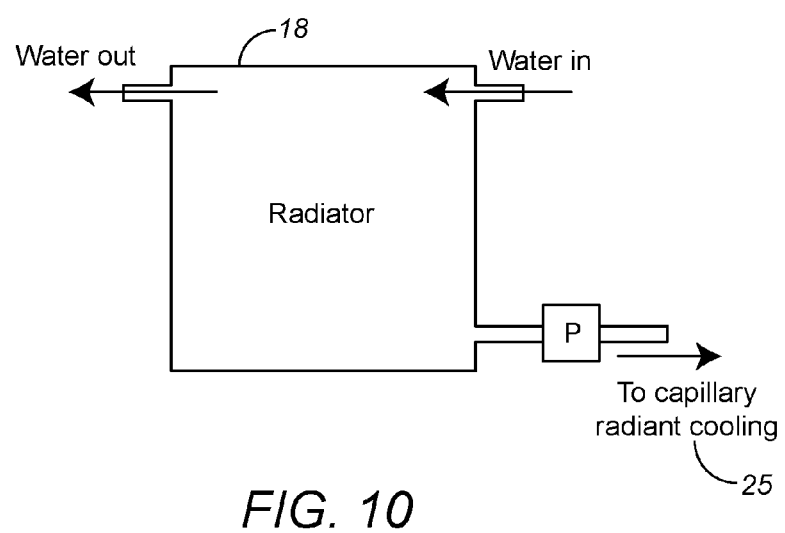
FIG. 10 is a block diagram of another embodiment of the invention, showing a portion of the system having an undercarriage heating element of the system of FIG. 1 thereof.
Figure 11:
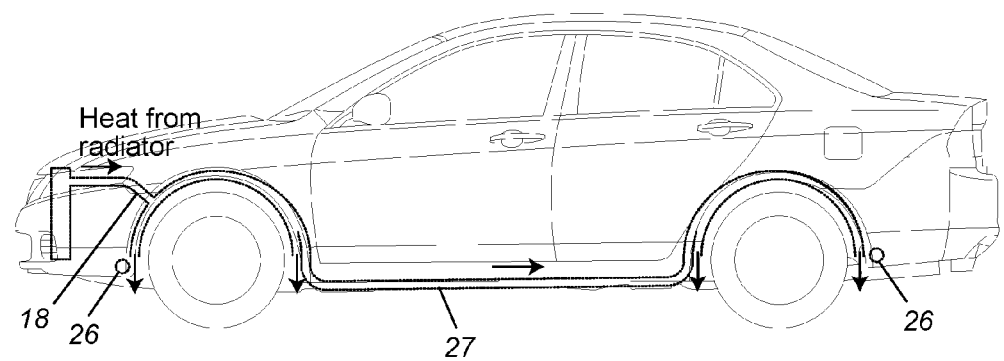
FIG. 11 is a side elevation view of a vehicle for the embodiment of FIG. 10 thereof, showing undercarriage temperature sensors, a heating element, and means of transfer the heat to the undercarriage.
Figure 12:
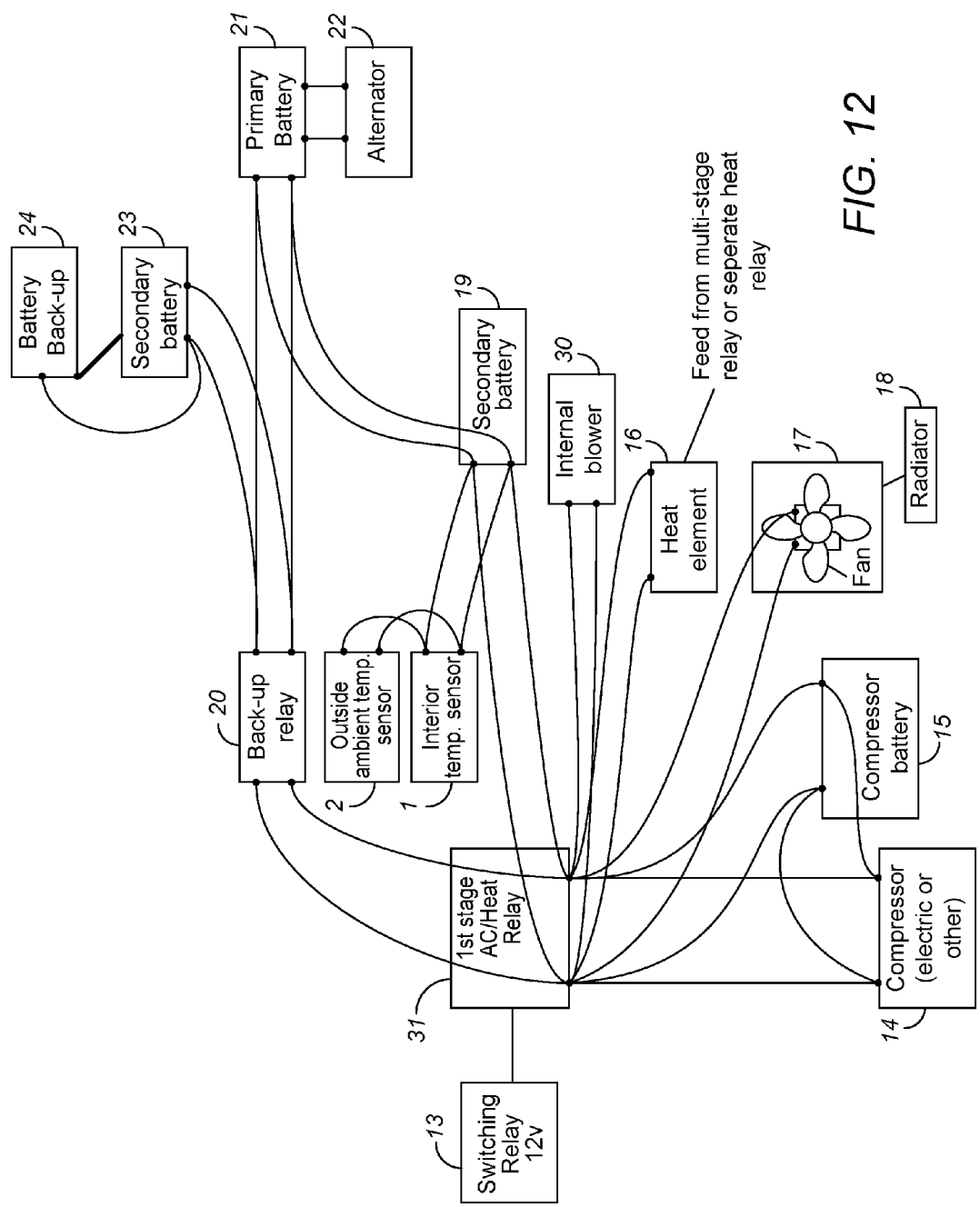
FIG. 12 is a schematic of the embodiment of FIG. 10 thereof, showing the circuitry of the controlling means and the charging means, showing the plurality of relays, the cooling mechanism, heating mechanism, and power sources thereof.
Figure 13:
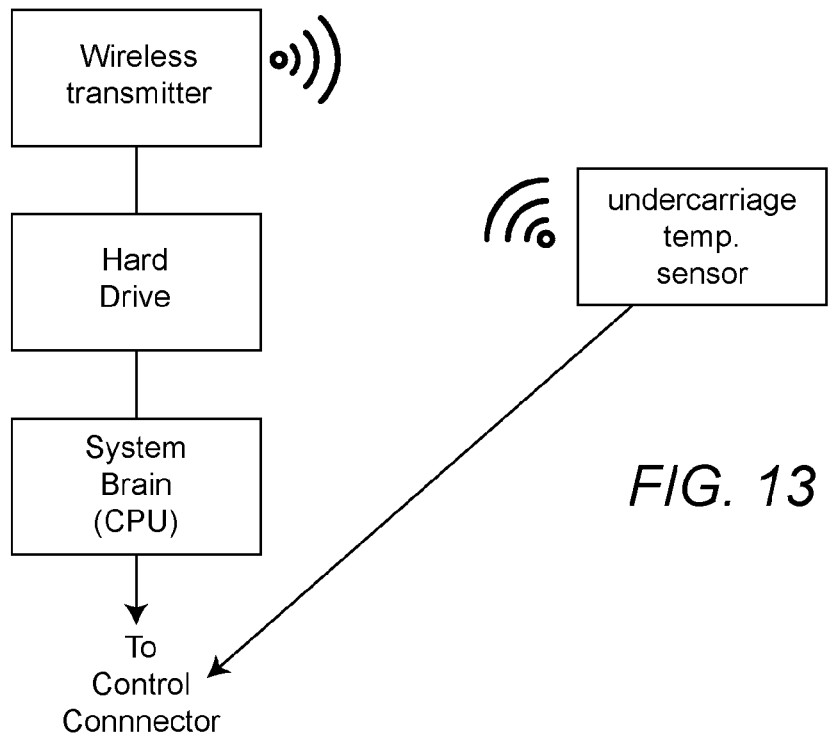
FIG. 13 is a flow chart of the interaction between the undercarriage temperature sensors and the CPU of FIG. 10 thereof.
Figure 14:
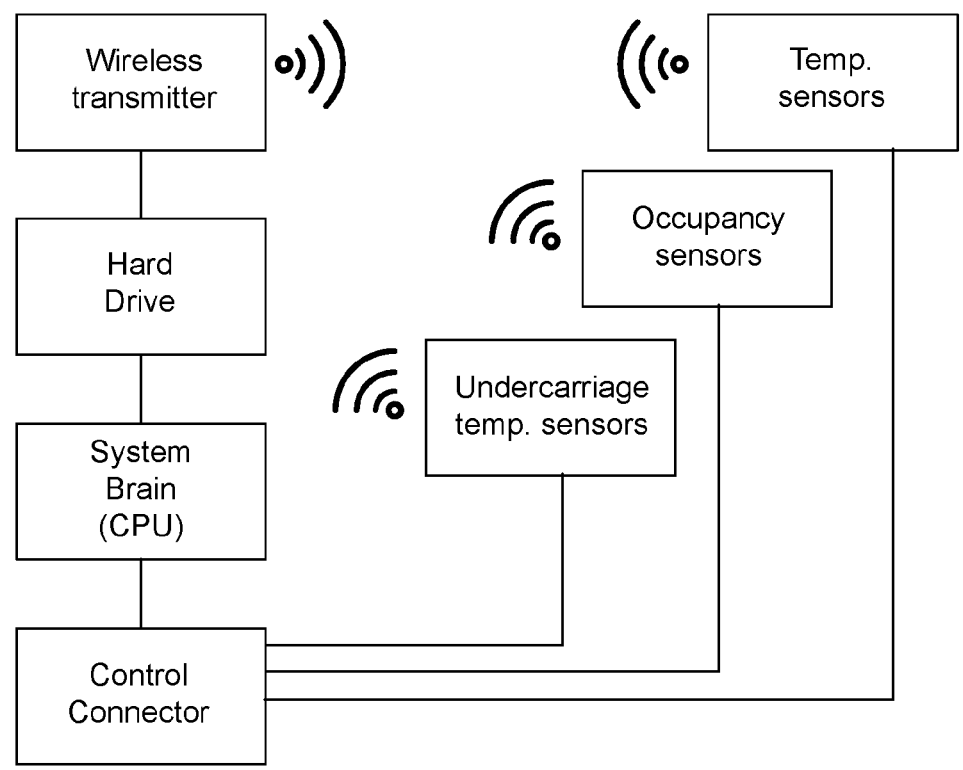
FIG. 14 is a flow chart of the interaction between the undercarriage temperature sensors, the ambient air and interior cabin air temperature sensors, the occupant sensors, and the CPU of FIG. 10 thereof.

In a preferred embodiment shown in FIG. 9, the controlling means selectively controls the vehicle's onboard cooling mechanism and heating mechanism in response to a command from the CPU via the transmitter. The controlling means includes a controller 13, a plurality of relays 20, 31, a cooling mechanism 14, a heating mechanism 16, and an internal blower 30. In a preferred embodiment, the controlling means includes a controller 13, an AC/Heat relay 31, at least one backup relay 20, a cooling mechanism having a compressor 14 and a battery 15, a heating mechanism having a heating element 16, a fan 17, a radiator 18, feed from a multi-stage relay or a separate heat relay, and an internal blower 30.

The plurality of relays used with the system may be located in any unused or available relay spot inside the vehicle. The controller 13 is a relay that is in electrical connectivity with the CPU via the wired transmitter. Once activated by the CPU, the controller closes the circuit to activate the climate adjustment mechanisms. Preferably, the controller is a 12V relay. A first stage AC/Heat relay 31 closes the circuit to initiate either the cooling mechanism or the heating mechanism. The AC/Heat relay is in electrical connectivity with the controller, the cooling mechanism, the battery for the cooling mechanism, the fan, the internal blower, the heating mechanism, and the backup relay. The backup relay is in further electrical connectivity with a primary battery 21 and a secondary battery 23. As shown in FIG. 9, each relay is dual wired, with two per connector for providing additional backup for the system. When the temperature inside the cabin returns to within an acceptable temperature threshold or when the occupant is removed, the CPU sends another command to the controller to open the circuit to disengage the cooling mechanism or heating mechanism, whichever is applicable. The controller relay further connects to the vehicle's existing microphone to allow the system to utilize voice activation and recognition of the vehicle's existing technology. For instance, an operator or occupant inside the vehicle could say "It's hot in here" to activate the cooling mechanism before the temperature threshold is exceeded.

Preferably, the system uses the vehicle's existing or onboard cooling mechanism, namely, the cooling or air conditioning system, and the heating mechanism, namely, the onboard heater, each of which is operable with this invention. Here, the system starts the vehicle's engine and also directs the controller to selectively initiate the cooling mechanism or heating mechanism. In another embodiment, the system further includes an auxiliary cooling mechanism and heating mechanism that are actuated without starting the vehicle engine.

In FIG. 9, the cooling mechanism has a compressor that is dual wired and coupled to a compressor battery and to the first stage AC/Heat relay. The compressor may be an electric compressor or an electronic commutated compressor and is used to impart cooler air through the cabin air vents. The compressor uses at least one hose or tubing (not shown) for transferring the cool air toward the cabin air vents. All hoses used with the system should be made from a flexible material and should be rated at least 500 psi over extreme calculated operating pressure. The compressor is powered by the compressor battery 15, which is in turn charged by the secondary battery 19. The compressor battery 15 should be operable in the event of a failure in the sequences of the system so that the cooling mechanism can still release cool air through the air vents. The cooling mechanism may further include an alarm and an automatic shutoff member to prevent overheating.

The heating mechanism includes an inline or airstream, and a heating element, namely, a radiator and a fan. The heating element may further include a feed from a multi-stage relay or separate heat relay using similar principles as heat elements in an air handler. The heating element and the fan are each dual wired and coupled to the first stage AC/Heat relay, which is powered by the secondary battery 19.

FIGS. 10-14 illustrate another embodiment of the invention. Here, the system can further warm, thaw, or de-ice the undercarriage and exterior doors of the vehicle upon detection of extreme cold temperature along the undercarriage, the wheels, and exterior doors. Here, the detecting means further includes an undercarriage temperature sensing mechanism 26, at least one heat transfer member 27 cooperating with the heating mechanism 18, 25, and the controlling means further includes a relay to direct the heating element toward the undercarriage. The undercarriage temperature sensing mechanism detects and senses the ambient air temperature and climate conditions along the vehicle's wheels and undercarriage as undercarriage temperature data, then transmits that data to the data collecting means. The data collecting means, namely the CPU, monitors and evaluates the received undercarriage temperature data, and if it determines that an undercarriage temperature threshold has been exceeded, then it sends a command to the controlling means, namely the controller. The controller closes the circuit to actuate the heating mechanism and further to direct the heat toward the heat transfer member. Each heat transfer member may be flexible tubing or ductwork positioned on or near at least four points along the undercarriage on each side of the vehicle.

The heat transfer member generates enough heat from the radiator to transfer the along the length of the transfer member. The tubing or ducts pull and draw air from the radiator without interfering or obstructing the radiator. The tubing or ducts point downwardly for undercarriage ventilation to direct the heat downwardly toward the undercarriage and wheels. The tubing may be selected from the group consisting of PVC tubing, polyurethane tubing, sock tubing, and combinations thereof. Sock tubing is preferred. The tubing or ductwork may be pressed against the body of the vehicle and fastened to the undercarriage with adhesives or clamps to keep the tubing in place without interfering with the operation of the vehicle or wheels. Outside temperatures can drop low enough to form sleet or ice that temporarily adheres to the wheels and adjacent thereto, including the undercarriage of the vehicle. The heat element imparts heat toward the undercarriage ductwork and thaws out the ice or packed snow along the wheels. In this situation, only a small amount of heat is needed to melt or de-ice around the wheels or door handle.

The system further includes a charging means for charging and powering the system. The charging means includes at least two power sources. The system can be charged while the vehicle engine is running, with at least one of the power sources drawing a charge for stored power which will be utilized by the second power source when the engine is off. A purpose for the plurality of the power sources is to maintain consistent power to operate the system in each mode over an extended period of time and to provide backup power for the system when the engine is off.

In one preferred embodiment, the power source includes a primary battery 21 with an alternator, a secondary battery 19, a secondary battery 23, and a backup battery 24. The primary battery is the vehicle's battery and charges the entire system components when the system is in charging mode. The primary battery is dual wired and is coupled to the secondary battery 19, the backup relay 20, and the vehicle's alternator. The secondary battery 19 is dual wired and coupled to the interior cabin air temperature sensor, which is dual wired and coupled to the ambient air temperature sensor. This secondary battery provides secondary backup power to the temperature sensors and to the AC/Heat relay. The secondary battery 19 is activated after the primary battery is disengaged when the engine is turned off so that the system remains operable. The secondary "third" battery 23 is dual wired and coupled to the backup relay 20. The secondary battery 23 is further coupled to the battery backup 24. If the secondary battery 19 fails, then battery 23 is used as memory for the system. The backup battery 24 powers secondary battery 23, which in turn powers backup relay. The backup battery is essentially a memory battery to hold information and is in use regardless of whether the primary or secondary batteries are being used. Each secondary battery 19 and 23 and the backup battery 24 are physically small and do not interfere with the vehicle's existing components. An 8-hour service battery is also used to notify the operator that the system should be promptly serviced for updates and maintenance.

Alternatively, the system may be charged by power sources other than the vehicle's primary battery. The alternative power source may include, but is not limited to, hydraulic power, kinetic energy, wind energy, or solar power. When the power source uses solar power, the system has a plurality of solar panels or solar cells positioned on or disposed on the vehicle to draw solar energy for conversion into electric power to run the system.

The charging means may further include a charging member (not shown) for charging the system with an external power source. The charging member has a cable, an AC/DC converter adapter, a cigarette lighter adapter, and a USB adapter. The cable is a universal cable that can be adapted to operate with the AC/DC converter adapter and the USB adapter. One end of the cable is insertable into one of the CPU's USB ports. The cable connects the AC/DC converter adapter to the CPU and to an external 120V AC outlet to charge the system's secondary batteries or backup battery. The USB adapter connects the cable to the CPU to an external device, for example, a universal charging station, to charge one or more of the system's secondary batteries or backup battery. The USB adapter also allows the operator to transfer data to and from the CPU and the data storage device to an external storage device.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

We claim:

1. An improved climate control, safety, and communications system for a vehicle having an interior passenger cabin, said system comprising:

a. a detecting means comprising at least one temperature sensing mechanism for detecting the climate conditions for a vehicle as temperature data, and at least one occupant sensing mechanism for detecting the presence of at least one occupant inside the vehicle cabin as occupancy data, wherein said detecting means continuously transmits said temperature data and said occupancy data to a data collecting means;

b. said data collecting means for monitoring and evaluating said temperature data for exceeding a temperature threshold and said occupancy data for exceeding an occupant threshold, and for implementing an action parameter to independently send a command to a controlling means, with said data collecting means comprising a CPU, a control connector, and a communication means for notifying an operator of the status of said temperature data and said occupancy data, with said communication means also for sending a notification to the operator, c. said controlling means for selectively controlling and adjusting the climate conditions inside the vehicle cabin, said controlling means comprising a plurality of relays, a cooling mechanism, and a heating mechanism, with one of the plurality of relays being a backup relay; and d. a charging means comprising at least two power sources for charging said system and for powering said system when the vehicle engine is turned off, with at least one of said power sources comprising a primary battery with an alternator, a secondary battery coupled to both said primary battery and said temperature sensing mechanism, and a backup battery coupled to said primary battery.

2. The system of claim 1, said system operates in one of a monitoring mode, a controlling mode, and a charging mode, with said monitoring mode for detecting, monitoring, and evaluating the climate conditions and presence of at least one occupant inside the vehicle, said controlling mode for selectively controlling and adjusting the climate conditions inside the cabin, and said charging mode for charging said system and for updating information to said system for implementation during said monitoring mode and said controlling mode; wherein said detecting means and said data collecting means each being operable in said monitoring mode, wherein said controlling means being operable in said controlling mode, and wherein said charging means being operable in said charging mode for charging and powering said system; wherein when the vehicle engine is turned off, said system converting to said monitoring mode while the climate conditions remains at the temperature threshold, with said system then converting to said controlling mode when the climate conditions exceeds the temperature threshold, and with said system converting back to said monitoring mode when the climate conditions returns to the temperature threshold until the vehicle engine is turned back on, with said system converting to said charging mode at least while the vehicle engine is on.

3. The system of claim 1, said occupant sensing mechanism being selected from the group consisting of one or more magnetometers, infrared devices, motion sensors and detectors including a recording means, body heat sensors, BTU sensors, and combinations thereof.

4. The system of claim 3, said occupant sensing mechanism comprising at least two magnetometers for detecting the displacement of an operator or an occupant inside the vehicle, and for transferring said occupancy data to said data collecting means.

5. The system of claim 1, said control connector being coupled to each of said temperature sensing mechanism and said occupant sensing mechanism for transferring said temperature data and said occupancy data to said data collecting means, and said temperature sensing mechanism and said occupant sensing mechanism each also being wireless to transfer said temperature data and said occupancy data to said data collecting means over a network.

6. The system of claim 1, said CPU for monitoring and evaluating each of said temperature data, said temperature threshold, said occupancy data, and said occupancy threshold, for sending the command to said communication means to notify the operator, and for directing the action parameter to said controlling means to selectively adjust the temperature inside the vehicle cabin; said control connector having a wired harness coupling each of said temperature sensing mechanism and said occupant sensing mechanism to said CPU; at least one data storage means.

7. The system of claim 6, said data collecting means further comprising a fingerprint scanner coupled to said CPU, and a display having a wired harness coupled to said CPU for customizing said system's temperature threshold, occupant threshold, and system control settings; said CPU being further capable of obtaining updated information about upcoming climate conditions from an external data source through said communication means.

8. The system of claim 6, said data storage means further comprising at least one data storage member having a capacity to retain information over an extended period of time, and an offsite external server for long term data storage, said data storage member coupled to said CPU at a connection port on said CPU; said communication means further comprising a transmitter, a network, and at least one receiving member, wherein said transmitter being coupled to said data storage member, wherein said receiving member being selected from the group consisting of mobile or handheld devices, desktop computers, offsite external servers, a display screen, and combinations thereof, each of which is capable of receiving notification alerts from said CPU and of sending a return response command back to said CPU.

9. The system of claim 1, said controlling means further comprising one of said plurality of relays being a 12V relay controller and an AC/Heat relay, wherein said 12V relay controller activating said AC/Heat relay to selectively initiate said cooling mechanism or said heating mechanism to adjust the temperature inside the vehicle cabin to said temperature threshold.

10. An improved climate control, safety, and communications system for a vehicle having an interior passenger cabin, said system comprising:
 a. a detecting means comprising at least one temperature sensing mechanism for detecting the air temperature inside the cabin as temperature data, and at least one occupant sensing mechanism for detecting the presence of at least one occupant inside the vehicle cabin as occupancy data, wherein said detecting means continuously transmits said temperature data and said occupancy data to a data collecting means;
 b. said data collecting means for monitoring and evaluating said temperature data for exceeding a temperature threshold and said occupancy data for exceeding an occupant threshold, for communicating the status of said temperature data and said occupancy data as a notification to an operator, and for sending a command to a controlling means, with said data collecting means comprising a CPU, at least one data storage means, a control connector, and a communication means for notifying the operator of the status of said temperature data and occupancy data;
 c. said controlling means for selectively controlling and adjusting the climate conditions inside the vehicle cabin upon command from said data collecting means, wherein said controlling means comprising a plurality of relays, a cooling mechanism, and a heating mechanism; and
 d. a charging means comprising at least two power sources for charging said system and for powering said system when the vehicle engine is turned off; with at least one of said power sources comprising a primary battery with an alternator, a secondary battery coupled to said primary battery and said temperature sensing mechanism, a third battery, and a backup battery coupled to said primary battery.

11. The system of claim 10, said heating mechanism comprising a heating element having a radiator and a fan, said heating mechanism for imparting warmer air through the cabin air vents.

12. The system of claim 10, said system operates in one of a monitoring mode, a controlling mode, and a charging mode, with said monitoring mode for detecting, monitoring, and evaluating the climate conditions and presence of at least one occupant inside the vehicle, said controlling mode for selectively controlling and adjusting the climate conditions inside the cabin, and said charging mode for charging said system and for updating information to said system for implementation during said monitoring mode and said controlling mode; wherein said detecting means and said data collecting means each being operable in said monitoring mode, wherein said controlling means being operable in said controlling mode, and wherein said charging means being operable in said charging mode for charging and powering said system; wherein when the vehicle engine is turned off, said system converting to said monitoring mode while the climate conditions remains at the temperature threshold, with said system then converting to said controlling mode when the climate conditions exceeds the temperature threshold, and with said system converting back to said monitoring mode when the climate conditions returns to the temperature threshold until the engine is turned back on, with said system converting to said charging mode at least while the vehicle engine is on.

13. The system of claim 10, said temperature sensing mechanism further comprising an ambient air temperature sensor for detecting the air temperature outside the vehicle as part of the temperature data.

14. The system of claim 10, said occupant sensing mechanism comprising at least two magnetometers for detecting the displacement of the operator or an occupant inside the vehicle, and for transferring said occupancy data to said data collecting means.

15. The system of claim 10, each of said temperature sensing mechanism and said occupant sensing mechanism further being wired to and in wireless communication with said CPU through said control connector.

16. The system of claim 10, said data collecting means further comprising a fingerprint scanner coupled to said CPU, and a display having a wired harness coupled to said CPU for customizing said system's temperature threshold, occupant threshold, and system control settings; said CPU further capable of obtaining updated information about upcoming climate conditions from an external data source through said communication means.

17. The system of claim 10, said data storage means further comprising at least one data storage member having a capacity to retain information over an extended period of time, and an offsite external server for long term data storage, said data storage member coupled to said CPU at a connection port on said CPU; said communication means further comprising a transmitter, a network, and at least one receiving member, wherein said transmitter being coupled to said data storage member, wherein said receiving member being selected from the group consisting of mobile or handheld devices, desktop computers, offsite external servers, a display screen, and combinations thereof, each of which is capable of receiving notification alerts from said CPU and of sending a return respond command back to said CPU.

18. The system of claim 10, said controlling means further comprising one of said plurality of relays being a 12V relay controller and an AC/Heat relay, wherein said 12V relay controller for activating said AC/Heat relay to selectively initiate said cooling mechanism or said heating mechanism to adjust the temperature inside the vehicle cabin to said temperature threshold.

19. The system of claim 10, said cooling mechanism comprising tubing, a compressor battery, and an electric compressor or an electronic commutated compressor for imparting cooler air through the cabin air vents, wherein said electronic commutated compressor or said electric compressor being dual wired and coupled to said compressor battery and to the first stage AC/Heat relay, wherein said AC/Heat relay being one of the plurality of relays.

20. An improved climate control, safety, and communications system for a vehicle having an undercarriage, at least one wheel, and a wheelbase, said system comprising:
 a. a detecting means comprising at least one undercarriage temperature sensing mechanism for detecting the climate conditions of the vehicle undercarriage as undercarriage temperature data, and for continuously transmitting said undercarriage temperature data to a data collecting means;
 b. said data collecting means comprising a CPU, at least one data storage means, a control connector having a harness, and a communication means, wherein said CPU monitors and evaluates said undercarriage temperature data for exceeding an undercarriage temperature threshold, for directing said communication means to notify an operator of the status of said undercarriage temperature data, and for sending a command to a controlling means to alter the climate conditions around the undercarriage or, if the climate adjustment has already been made, to cease the adjustment;
 c. said controlling means comprising a plurality of relays, a heating element, and at least one heat transfer member for transferring heat from said heating element to said undercarriage, with one of the plurality of relays being a backup relay, and wherein said controlling means initiating said heating element to warm, thaw, or de-ice the vehicle around at least the undercarriage, the wheels, and wheelbase; and
 d. a charging means comprising at least two power sources for charging said system and for powering said system when the vehicle engine is turned off, wherein at least one of said power sources comprising a primary battery with an alternator, a secondary battery coupled to both said primary battery and said temperature sensing mechanism, and a backup battery coupled to said primary battery.

21. The system of claim 20, said system further comprising
 a. said detecting means further comprising at least one temperature sensing mechanism for detecting the air temperature inside the cabin as temperature data, and at least one occupant sensing mechanism for detecting the presence of at least one occupant inside the vehicle cabin as occupancy data, wherein said detecting means continuously transmits said temperature data and said occupancy data to said data collecting means;
 b. said data collecting means further monitoring and evaluating said temperature data for exceeding a temperature threshold and said occupancy data for exceeding an occupant threshold, for communicating the status of said temperature data and said occupancy data as a notification to an operator, for sending a notification to an operator, and for implementing an action parameter to independently send a command to said controlling means;
 c. said controlling means further selectively controlling and adjusting the climate conditions inside the cabin.

22. An improved climate control, safety, and communications system for a vehicle having an interior passenger cabin, said system comprising:
 a. a detecting means comprising an interior cabin air temperature sensor for detecting the interior cabin air temperature inside the vehicle as temperature data, a plurality of magnetometer occupant sensors for detecting at least one occupant inside the vehicle as occupancy data, with each of said temperature sensor and said occupant sensors continuously transmitting said temperature data and said occupancy data to a data collecting means;

b. said data collecting means comprising a CPU, at least two data storage members, a control connector having a harness, and a communication means, wherein said control connector harness connects said interior cabin air temperature sensor and the plurality of said magnetometer occupant sensors to said CPU, wherein said CPU monitors and evaluates said temperature data for exceeding a temperature threshold and said occupancy data for exceeding an occupant threshold, and for directing said communication means to notify an operator of the status of said temperature data and said occupancy data, and for sending a command to a controlling means to alter the climate conditions inside the vehicle cabin or, if the climate adjustment has already been made, to cease the adjustment;

c. said controlling means comprising a 12V switching relay, an AC/Heating relay, at least one backup relay, a cooling mechanism, and a heating mechanism, wherein said 12V switching relay closes a circuit to said AC/Heating relay, wherein said AC/Heating relay selectively closes a circuit to activate either said cooling mechanism or said heating mechanism;

d. said charging means comprising a plurality of power sources; and e. said system further operates in one of a monitoring mode, a controlling mode, and a charging mode, wherein said detecting means and said data collecting means each being operable in said monitoring mode, wherein said controlling means being operable in said controlling mode, and wherein said charging means being operable in said charging mode for charging and powering said system; wherein when the vehicle engine is turned off, said system converting to said monitoring mode while the climate conditions remains at the temperature threshold, with said system then converting to said controlling mode when the climate conditions exceeds the temperature threshold, and with said system converting back to said monitoring mode when the climate conditions returns to the temperature threshold until the vehicle engine is turned back on, with said system converting to said charging mode at least while the vehicle engine is on.

23. The system of claim 22, said heating mechanism comprising a heating element having a radiator and a fan for imparting warmer air through the cabin air vents.

24. The system of claim 22, at least one of said power sources comprising a primary battery having an alternator, a secondary battery coupled to said primary battery and said temperature sensing mechanism, a third battery, and a backup battery coupled to said primary battery.

25. The system of claim 22, said data collecting means further comprising a fingerprint scanner coupled to said CPU, and a display having a wired harness coupled to said CPU for customizing said system's temperature threshold, occupant threshold, and system control settings; said CPU further capable of obtaining updated information about upcoming climate conditions from an external data source through said communication means; said communication means further comprising a transmitter, a network, and at least one receiving member, wherein said transmitter being coupled to said data storage member, wherein said receiving member being selected from the group consisting of mobile or handheld devices, desktop computers, offsite external s tempers, a display screen, and combinations thereof, each of which is capable of receiving notification alerts from said CPU and of sending a return respond command back to said CPU.

26. The system of claim 22, said cooling mechanism comprising tubing, a compressor battery, and an electric compressor or an electronic commutated compressor for imparting cooler air through the cabin air vents, wherein said electric compressor or electronic commutated compressor being dual wired and coupled to said compressor battery and to the first stage AC/Heat relay.

\* \* \* \* \*